(12) United States Patent
Yuki et al.

(10) Patent No.: US 11,549,592 B2
(45) Date of Patent: Jan. 10, 2023

(54) CAP MEMBER FOR SHUT-OFF VALVE, VALVE ELEMENT FOR SHUT-OFF VALVE, METHOD FOR MANUFACTURING SHUT-OFF VALVE, AND METHOD FOR REPLACING VALVE ELEMENT OF SHUT-OFF VALVE

(71) Applicant: HONDA MOTOR CO., LTD., Tokyo (JP)

(72) Inventors: Kenji Yuki, Tokyo (JP); Masahiro Yamada, Tokyo (JP); Satoru Kimura, Tokyo (JP); Nobuo Kawauchi, Tokyo (JP); Yu Shindo, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/681,954

(22) Filed: Feb. 28, 2022

(65) Prior Publication Data
US 2022/0307607 A1 Sep. 29, 2022

(30) Foreign Application Priority Data
Mar. 25, 2021 (JP) .............................. JP2021-051383

(51) Int. Cl.
*F16K 1/30* (2006.01)
*F16K 1/38* (2006.01)
(Continued)

(52) U.S. Cl.
CPC .............. *F16K 1/385* (2013.01); *B22D 18/06* (2013.01); *F16K 1/303* (2013.01); *F16K 1/482* (2013.01);
(Continued)

(58) Field of Classification Search
CPC .......... F16K 1/303; F16K 1/385; F16K 1/482; F16K 1/487; F16B 31/02;
(Continued)

(56) References Cited

U.S. PATENT DOCUMENTS 2,838,816 A * 6/1958 Strom .................... B22D 18/04
249/56
3,121,926 A * 2/1964 Morton .................. B22D 17/14
164/DIG. 9
(Continued)

FOREIGN PATENT DOCUMENTS

| JP | 63-235711 | 9/1988 |
| JP | 4892536 | 3/2012 |

*Primary Examiner* — Craig J Price
(74) *Attorney, Agent, or Firm* — Amin, Turocy & Watson, LLP

(57) ABSTRACT

A cap member is used in a shut-off valve including a valve head in which a through hole is formed, the cap member including: a cap member main body screwed into the through hole; a first engaging portion for engaging with a first tool for screwing the cap member main body into the valve head; a second engaging portion formed inside the cap member main body to engage with a second tool for unscrewing the cap member main body from the valve head; and a wall portion covering the second engaging portion so that the second engaging portion is not exposed when the cap member is viewed from the first engaging portion toward the second engaging portion.

10 Claims, 9 Drawing Sheets

(51) Int. Cl.
 *B22D 18/06* (2006.01)
 *F16K 1/48* (2006.01)

(52) U.S. Cl.
 CPC ......... *F16K 1/487* (2013.01); *Y10T 137/0491* (2015.04)

(58) Field of Classification Search
 CPC ............ B22D 18/00–08; B22D 17/145; B29C 45/1734; B29C 2045/1738; Y10T 137/0441; Y10T 137/0491; Y10T 137/6154; Y10T 137/6109; Y10T 137/6113; Y10T 137/6065; Y10T 137/6086; Y10T 137/6161–6181; Y10S 425/812
 USPC ........ 285/387; 425/812, 420, 130, 564, 566, 425/562, 563; 164/304, 305, 410, 142; 251/267, 339, 333, 319; 137/15.08, 137/15.18, 327, 315.41, 315.42, 315.27, 137/315.33, 329–329.06
 See application file for complete search history.

(56) References Cited

U.S. PATENT DOCUMENTS

| | | | | |
|---|---|---|---|---|
| 3,885,618 | A * | 5/1975 | Hodler | B22D 17/14 164/410 |
| 3,901,307 | A * | 8/1975 | Nieman | B22C 9/08 164/244 |
| 4,201,742 | A * | 5/1980 | Hendry | B29C 44/428 264/DIG. 83 |
| 4,431,047 | A * | 2/1984 | Takeshima | B22D 17/14 164/253 |
| 4,489,771 | A * | 12/1984 | Takeshima | B22D 17/14 425/420 |
| 4,538,666 | A * | 9/1985 | Takeshima | B22C 9/067 425/420 |
| 4,691,755 | A * | 9/1987 | Kuriyama | B22D 17/145 425/420 |
| 4,722,385 | A * | 2/1988 | Yamauchi | B22D 17/145 425/420 |
| 4,779,667 | A * | 10/1988 | Fujino | B22D 17/145 425/420 |
| 4,836,272 | A * | 6/1989 | Priem | B22D 17/145 425/420 |
| 4,838,338 | A * | 6/1989 | Priem | B22D 17/145 164/113 |
| 4,986,338 | A * | 1/1991 | Yamauchi | B22D 17/145 164/113 |
| 4,987,946 | A * | 1/1991 | Van Riet | B22D 17/145 425/810 |
| 5,320,160 | A * | 6/1994 | Kato | B22D 15/005 164/133 |
| 5,770,237 | A * | 6/1998 | Sayer | B29C 45/1734 264/572 |
| 6,099,284 | A * | 8/2000 | Hardgrave | B29C 45/1734 264/572 |
| 6,923,243 | B2 * | 8/2005 | Uebayashi | B22D 17/145 164/410 |
| 8,083,854 | B2 * | 12/2011 | Cirette | F04B 53/12 118/723 MW |
| 8,550,146 | B2 * | 10/2013 | Mizukusa | B22D 17/14 249/141 |
| 2003/0056931 | A1 * | 3/2003 | Wuthrich | B22D 17/145 164/410 |

* cited by examiner

CAP MEMBER FOR SHUT-OFF VALVE, VALVE ELEMENT FOR SHUT-OFF VALVE, METHOD FOR MANUFACTURING SHUT-OFF VALVE, AND METHOD FOR REPLACING VALVE ELEMENT OF SHUT-OFF VALVE

CROSS-REFERENCE TO RELATED APPLICATIONS

This application is based upon and claims the benefit of priority from Japanese Patent Application No. 2021-051383 filed on Mar. 25, 2021, the contents of which are incorporated herein by reference.

BACKGROUND OF THE INVENTION

Field of the Invention

The present invention relates to a cap member for a shut-off valve used in a vacuum casting system, a valve element for the shut-off valve, a method for manufacturing the shut-off valve, and a method for replacing the valve element of the shut-off valve.

Description of the Related Art

Vacuum casting systems are known (for example, JP 4892536 B2). In the vacuum casting system, casting is performed by sucking gas in a cavity and then pouring molten metal into the cavity. Thus, gas is prevented from entering the molten metal. As a result, it is possible to reduce the occurrence of defects (blow holes, for example) in a cast product caused by the gas. The vacuum casting system includes a shut-off valve. When the molten metal is poured into the cavity, the shut-off valve shuts off the communication between the cavity and a suction path for sucking gas from the cavity.

The valve element of this shut-off valve may need to be replaced. This is because, with the use of the shut-off valve, the valve element is worn (uneven wear, for example), and as a result, the sealing performance of the shut-off valve is reduced. The valve element is attached to a drive mechanism for driving the shut-off valve. Therefore, in order to replace the valve element, it is necessary to remove the valve element from the drive mechanism by using a tool. However, since the valve element of the shut-off valve is installed in the vicinity of the cavity of a casting mold, it is not preferable that the valve element has an engaging portion for engaging with the tool. This is because, if the valve element has an engaging portion, the engaging portion may hinder the release of a cast product. The molten metal poured into the cavity reaches the valve element and then solidifies on the valve element. The solidified molten metal (that is, the cast product) may adhere to the engaging portion (particularly, the recessed portion) of the valve element, and hinder the release of the cast product.

SUMMARY OF THE INVENTION

As described above, there arises a problem that both the easiness of replacing the valve element and the easiness of releasing the cast product have to be achieved. An object of the present invention is to solve the above-mentioned problem.

According to an aspect of the present invention, provided is a cap member for a shut-off valve configured to shut off a suction path through which gas is sucked from a cavity portion of a casting mold, the shut-off valve including a valve head in which a through hole is formed, the cap member comprising: a cap member main body screwed into the through hole of the valve head; a first engaging portion configured to engage with a first tool that screws the cap member main body into the valve head; a second engaging portion formed inside the cap member main body and configured to engage with a second tool that unscrews the cap member main body from the valve head; and a wall portion formed between the first engaging portion and the second engaging portion and configured to cover the second engaging portion so that the second engaging portion is not exposed when the cap member is viewed from the first engaging portion toward the second engaging portion.

According to an aspect of the present invention, provided is a valve element for a shut-off valve configured to shut off a suction path through which gas in a cavity portion of a casting mold is sucked, the valve element comprising: a valve head including a through hole and attached through the through hole to a drive shaft configured to drive the valve element; and a cap member screwed into the through hole at a distal end portion of the valve head, wherein an engaging portion configured to engage with a tool that unscrews the cap member from the valve head is formed inside the cap member, the cap member includes a wall portion configured to cover the engaging portion from a distal end side of the cap member, and a distal end surface of the cap member is a flat surface not having a shape engaging with the tool.

According to an aspect of the present invention, provided is a method for manufacturing a shut-off valve by using the cap member for the shut-off valve according to the above-described aspect of the present invention, the shut-off valve being configured to shut off a suction path through which gas in a cavity portion of a casting mold is sucked, the method comprising: inserting a fastening member into the through hole of the valve head to attach the valve head to a drive shaft configured to drive the shut-off valve; engaging the first tool with the first engaging portion and screwing the cap member into the through hole of the valve head; and removing the first engaging portion.

According to an aspect of the present invention, provided is a method for replacing a valve element of a shut-off valve configured to shut off a suction path through which gas in a cavity portion of a casting mold is sucked, wherein a pre-replacement valve element includes: a first valve head including a through hole and attached through the through hole to a drive shaft configured to drive the pre-replacement valve element; and a first cap member screwed into the through hole at a distal end portion of the first valve head, an engaging portion is formed inside the first cap member, and the first cap member includes a wall portion configured to cover the engaging portion from a distal end side of the first cap member, and wherein a valve element for replacement includes: a second valve head; and a second cap member, the second valve head includes a through hole, and the second cap member includes: a first engaging portion; a second engaging portion formed inside the second cap member; and a wall portion formed between the first engaging portion and the second engaging portion and configured to cover the second engaging portion so that the second engaging portion is not exposed when the second cap member is viewed from the first engaging portion toward the second engaging portion, the method comprising: shaving the wall portion of the first cap member to expose the engaging portion; removing the first cap member from the first valve head by engaging a tool with the engaging portion and unscrewing the first cap member from the through hole of the first valve head; removing the first valve head from the drive shaft; inserting a fastening member into the through hole of the second valve head to attach the second valve head to the drive shaft; engaging a tool with the first engaging portion of the second cap member and screwing the second cap member into the through hole of the second valve head; and removing the first engaging portion of the second cap member.

According to the present invention, it is possible to achieve both the easiness of replacing the valve element and the easiness of releasing the cast product.

The above and other objects, features, and advantages of the present invention will become more apparent from the following description when taken in conjunction with the accompanying drawings, in which a preferred embodiment of the present invention is shown by way of illustrative example.

DESCRIPTION OF THE INVENTION

Figure 1:
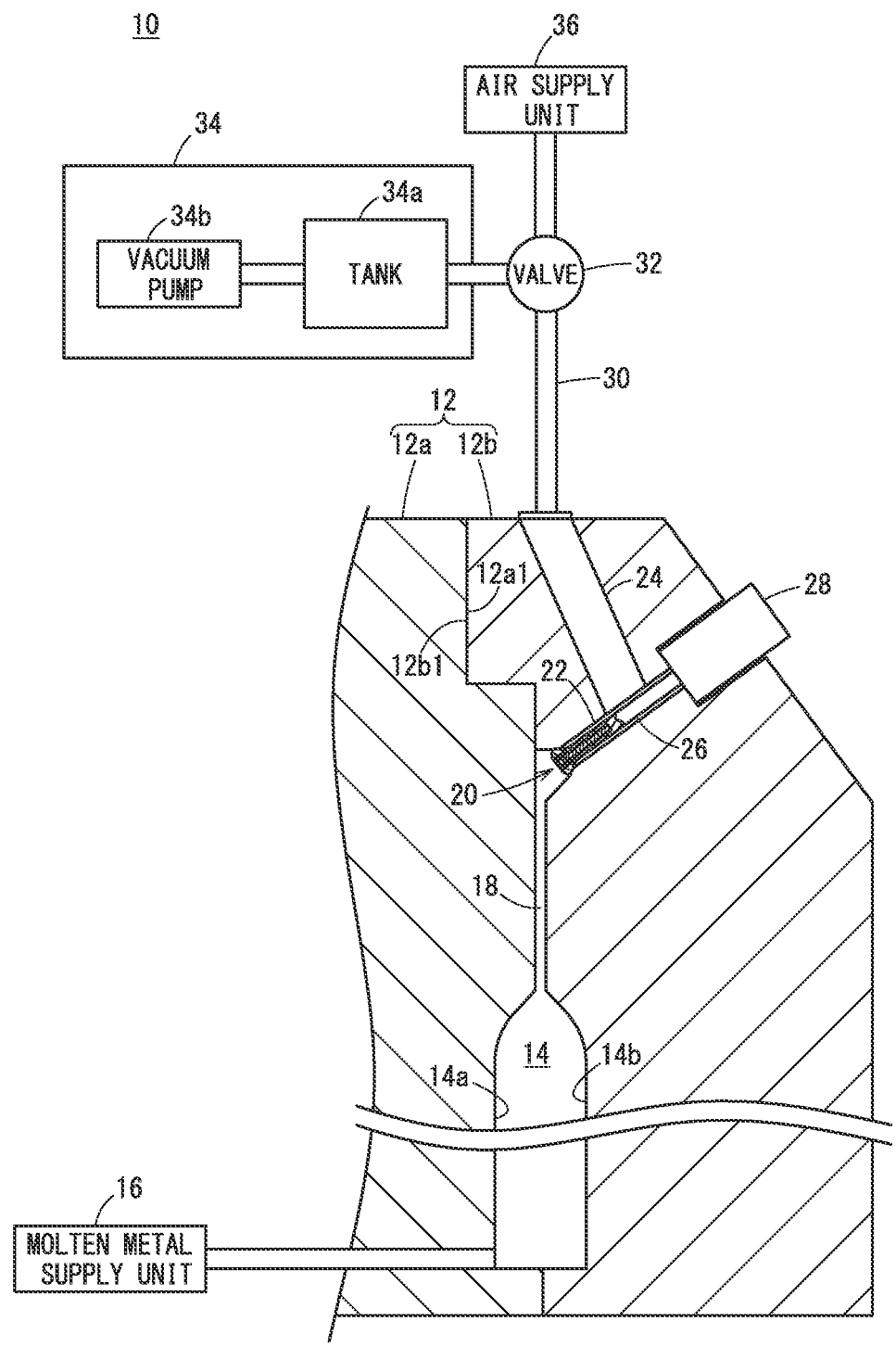
FIG. 1 is a view showing a vacuum casting system according to an embodiment of the present invention.

FIG. 1 is a view showing a vacuum casting system 10 according to an embodiment of the present invention.

The vacuum casting system 10 includes a casting mold 12. The casting mold 12 includes a fixed mold 12a and a movable mold 12b. The movable mold 12b is disposed on the right side of the fixed mold 12a in the drawing. The movable mold 12b can move toward and away from the fixed mold 12a in a lateral direction in the drawing. The fixed mold 12a and the movable mold 12b have mating surfaces 12a1 and 12b1, respectively. The mating surfaces 12a1 and 12b1 face each other. The mating surface 12a1 has a concave portion 14a. The mating surface 12b1 has a concave portion 14b. The concave portions 14a and 14b form a cavity portion 14. The movable mold 12b is moved toward the fixed mold 12a, and the mating surfaces 12a1 and 12b1 are brought into contact with each other. Thus, the casting mold 12 is closed. As a result, the cavity portion 14 is formed inside the casting mold 12.

The vacuum casting system 10 includes a molten metal supply unit 16. The molten metal supply unit 16 is attached to the fixed mold 12a and supplies molten metal into the cavity portion 14. The movable mold 12b includes an overflow portion 18. The overflow portion 18 is located downstream of the cavity portion 14. The molten metal supplied to the cavity portion 14 reaches the overflow portion 18 and solidifies inside the cavity portion 14 and the overflow portion 18. The solidified molten metal is taken out from the casting mold 12 as a cast product.

The casting mold 12 includes a shut-off valve 20, a suction path 22, and a suction path 24. The shut-off valve 20 is disposed between the overflow portion 18 and the suction path 22. The shut-off valve 20 is opened and closed by a valve drive unit 28 having a drive shaft 26, thereby preventing the molten metal from entering the suction path 22 from the overflow portion 18.

The suction path 24 is connected to a gas suction unit 34 through a suction path 30 and a valve 32 that are located outside the casting mold 12. The gas suction unit 34 sucks gas in the cavity portion 14 through the suction path 30, the suction path 24, the suction path 22, and the overflow portion 18. The gas suction unit 34 includes a tank 34a, and a vacuum pump 34b for depressurizing the tank 34a. The gas suction unit 34 sucks the gas in the cavity portion 14 by the tank 34a depressurized by the vacuum pump 34b. Here, before supplying the molten metal to the cavity portion 14, the gas suction unit 34 sucks the gas in the cavity portion 14. This makes it possible to reduce the occurrence of defects (blow holes, for example) in the cast product due to the mixing of the gas into the molten metal.

An air supply unit 36 is connected to the suction path 30, in addition to the gas suction unit 34. The air supply unit 36 blows air into the casting mold 12 in an open state, through the suction path 30, the suction path 24, the suction path 22, and the overflow portion 18 (air blowing). Thus, the air supply unit 36 cleans the suction path 22 and the like. The valve 32 is connected to the suction path 30, the gas suction unit 34, and the air supply unit 36. The valve 32 switches the connection of the gas suction unit 34 and the air supply unit 36 to the suction path 30.

Figure 2:
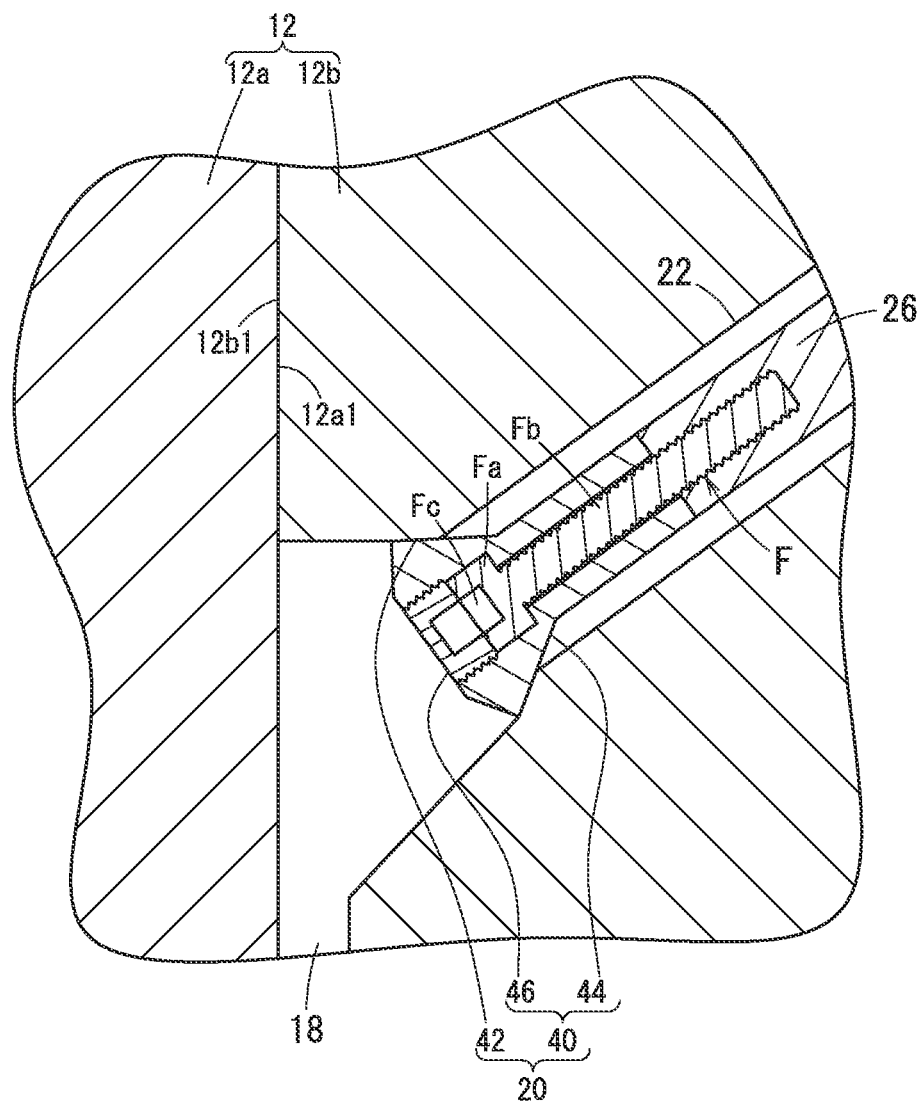
FIG. 2 is an enlarged view of the vicinity of a shut-off valve.
Figure 3:
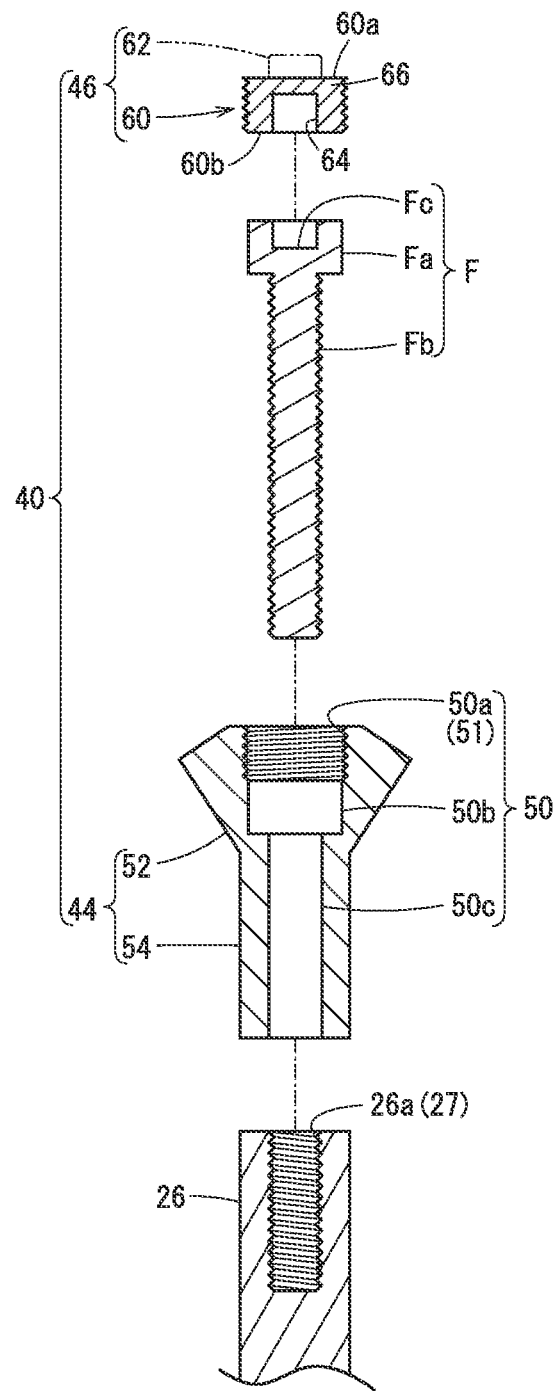
FIG. 3 is a view showing a state in which a valve element of the shut-off valve is disassembled.

FIG. 2 is an enlarged view of the vicinity of the shut-off valve 20. As shown in FIG. 2, the shut-off valve 20 includes a valve element 40 and a valve seat 42. The valve seat 42 is opened and closed by the valve element 40. That is, the valve seat 42 separates from and contacts with the valve element 40. FIG. 3 is a view showing a state in which the valve element 40 of the shut-off valve 20 is disassembled. The valve element 40 includes a valve head 44 and a cap member 46. The valve element 40 is attached to the drive shaft 26 of the valve drive unit 28 by a fastening member F (a bolt, for example).

The valve head 44 includes a through hole 50, a main body portion 52, and a shaft portion 54. The valve head 44 is attached to the drive shaft 26 by the fastening member F inserted through the through hole 50. The main body portion 52 is a main body of the valve element 40, and contacts with and separates from the valve seat 42. The shaft portion 54 is formed integrally with the main body portion 52. The shaft portion 54 has an outer diameter substantially the same as that of the drive shaft 26. When the valve head 44 is attached to the drive shaft 26, the shaft portion 54 abuts against the end portion of the drive shaft 26. The through hole 50 includes a hole 50a, a hole 50b, and a hole 50c. The holes 50a and 50b are formed in the main body portion 52. The hole 50c is formed in the shaft portion 54. The holes 50a and 50b have substantially the same inner diameter. The hole 50c has an inner diameter smaller than that of the holes 50a and 50b. When the valve head 44 is attached to the drive shaft 26, a head portion Fa of the fastening member F is disposed in the hole 50b and a shaft portion Fb of the fastening member F is disposed in the hole 50c. The shaft portion Fb protrudes from the hole 50c and is screwed into a hole 26a (that is, a female screw 27) of the drive shaft 26. Thus, the valve head 44 is fixed to the drive shaft 26. The head portion Fa of the fastening member F has an engaging recess Fc. When the valve head 44 is attached or removed, the engaging recess Fc engages with an attachment/detachment tool T0 (a hexagonal wrench, for example). The attachment/detachment tool T0 is a tool for screwing the fastening member F into the drive shaft 26 and unscrewing the fastening member F from the drive shaft 26. The inner periphery of the hole 50a has a female screw 51 with which the outer periphery of the cap member 46 is screwed. The cap member 46 is inserted into the hole 50a and screwed into the female screw 51. As a result, the cap member 46 covers the head portion Fa of the fastening member F.

Figure 4:
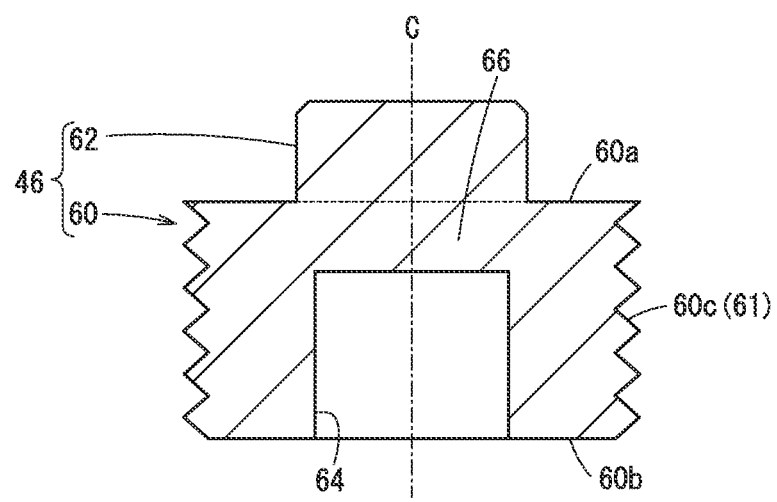
FIG. 4 is a view showing a cap member of the valve element before being attached.

FIG. 4 is a view showing the cap member 46 of the valve element 40 before being attached. The cap member 46 before being attached to the valve head 44 includes a columnar cap member main body 60, a columnar engaging projection 62 (first engaging portion), a columnar engaging recess 64 (second engaging portion), and a wall portion 66. The wall portion 66 separates the engaging projection 62 from the engaging recess 64. The wall portion 66 has a thickness that is strong enough to withstand the pressure and high temperature of the molten metal during casting.

The cap member main body 60 has a first end face 60a, a second end face 60b, and an outer peripheral surface 60c. The first end face 60a is oriented in one direction (first direction) along a central axis C. The second end face 60b is oriented in the other direction (second direction) along the central axis C. A male screw 61 is screwed into the through hole 50 (more specifically, the hole 50a) of the valve head 44.

The engaging projection 62 is an engaging portion for engaging with an attachment tool T1 (a first tool such as a wrench). When the valve element 40 is attached, the attachment tool T1 causes the cap member main body 60 to be screwed into the valve head 44. In order to facilitate the screwing of the cap member main body 60 into the valve head 44 by the attachment tool T1, the engaging projection 62 is disposed on the central axis C of the cap member main body 60.

As shown in FIG. 3, the distal end surface face (the first end face 60a of the cap member main body 60) of the cap member 46 after attachment is a flat surface. In other words, the engaging projection 62 is removed from the cap member 46. Therefore, the cap member 46 does not have a shape engaging with the tool. As will be described later, after the cap member main body 60 is attached to the valve head 44, the engaging projection 62 is removed in order to prevent the cast product from adhering to the cap member 46 during casting.

The engaging recess 64 is an engaging portion for engaging with a removal tool T2 (second tool such as a hexagonal wrench). When the valve element 40 is removed, the removal tool T2 unscrews the cap member main body 60 from the valve head 44. In order to facilitate unscrewing of the cap member main body 60 from the valve head 44 by the removal tool T2, the engaging recess 64 is disposed on the central axis C of the cap member main body 60.

The engaging recess 64 is formed inside the cap member main body 60. When the cap member 46 is viewed from the engaging projection 62 toward the engaging recess 64, the engaging recess 64 is covered by the wall portion 66 so that the engaging recess 64 is not exposed. That is, except when the valve element 40 (more specifically, the cap member 46) is removed, the engaging recess 64 is covered by the wall portion 66 and therefore is not exposed. Since the engaging recess 64 is not exposed, the cast product is prevented from adhering to the engaging recess 64 during casting. In order to remove the cap member 46, the wall portion 66 is shaved to expose the engaging recess 64, so that the removal tool T2 can engage with the engaging recess 64. Thus, the cap member 46 can be removed by unscrewing the cap member 46 from the valve head 44 using the removing tool T2.

It should be noted that the shape of the engaging recess 64 may coincide with that of the engaging recess Fc of the fastening member F on a plane perpendicular to the central axis C. This makes it possible to use the same tool (the removal tool T2, the attachment/detachment tool T0) for removing the cap member 46 and for attaching and removing the valve head 44.

Here, the engaging projection 62 may have a polygonal shape protruding from the first end face 60a of the cap member main body 60, and the engaging recess 64 may have a polygonal shape opening on the second end face 60b of the cap member main body 60. Thus, the cap member 46 including the engaging projection 62 and the engaging recess 64 can be easily fabricated by shaping (machining, for example) or casting a member. That is, in order to fabricate the cap member 46, it is not necessary to combine (bond, weld, etc.) a plurality of members. The polygonal shape may be, for example, a triangle to a decagon. One example of the polygonal shape is a hexagonal shape. The number of sides of the polygon of the engaging projection 62 and the number of sides of the polygon of the engaging recess 64 may be the same or different from each other.

(Manufacture of Shut-off Valve 20)

Figure 5:
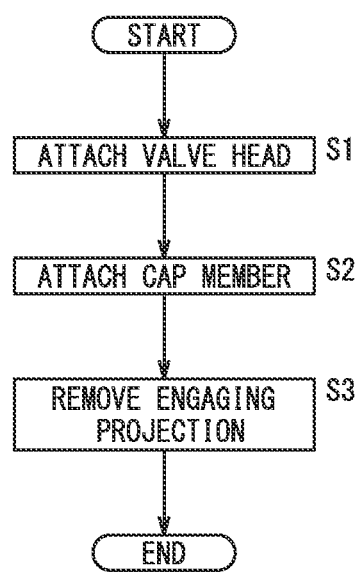
FIG. 5 is a flow chart showing a manufacturing procedure of the shut-off valve.
Figure 6A:
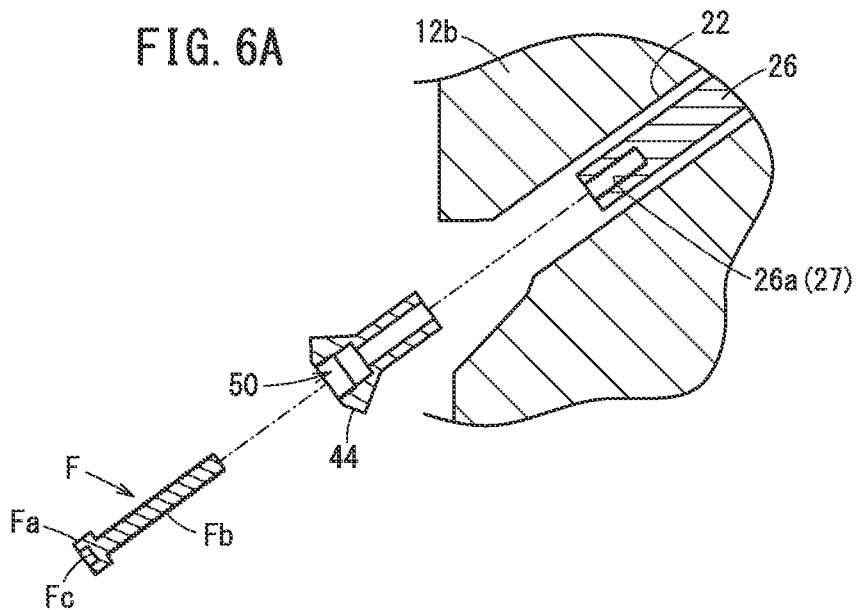
FIGS. 6A, 6B, and 6C are views each showing the state of the shut-off valve during manufacture.
Figure 6B:
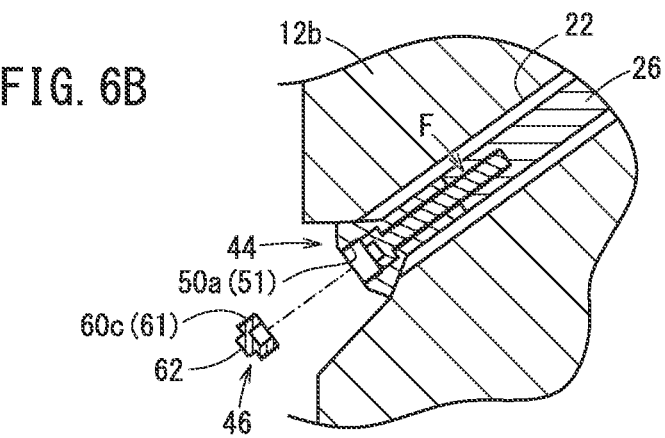
Figure 6C:
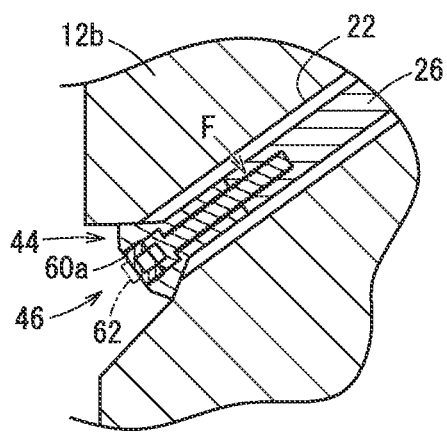

Hereinafter, a method for manufacturing the shut-off valve 20 will be described. FIG. 5 is a flow chart showing a manufacturing procedure of the shut-off valve 20. FIGS. 6A to 6C each show the state of the shut-off valve 20 during manufacture. Hereinafter, the method for manufacturing the shut-off valve 20 will be described with reference to FIGS. 5 and 6A to 6C.

The valve head 44 is attached to the drive shaft 26 (step S1, and FIG. 6A). First, the fastening member F is inserted into the through hole 50 of the valve head 44. Thereafter, the fastening member F is screwed into the female screw 27 of the drive shaft 26 by using the attachment/detachment tool T0, thereby attaching the valve head 44 to the drive shaft 26. Further, the cap member 46 is attached to the valve head 44 attached to the drive shaft 26 (step S2 and FIG. 6B). That is, the attachment tool T1 is engaged with the engaging projection 62, and the cap member 46 is screwed into the female screw 51 of the valve head 44 by using the attachment tool T1.

After the cap member 46 is attached, the engaging projection 62 is removed from the cap member 46. As a result, the first end face 60a of the cap member 46 (cap member main body 60) is smoothed (step S3, FIGS. 2, 3, and 6C). For example, the cap member 46 may be cut, machined, ground, or polished to remove the engaging projection 62 from the cap member 46. Thus, the first end face 60a of the cap member 46 is smoothed. In this way, attachment (screwing) of the cap member 46 can be facilitated, and the cast product can be prevented from adhering to the engaging projection 62 during casting.

(Replacement of Valve element 40 of Shut-off Valve 20)

Figure 7:
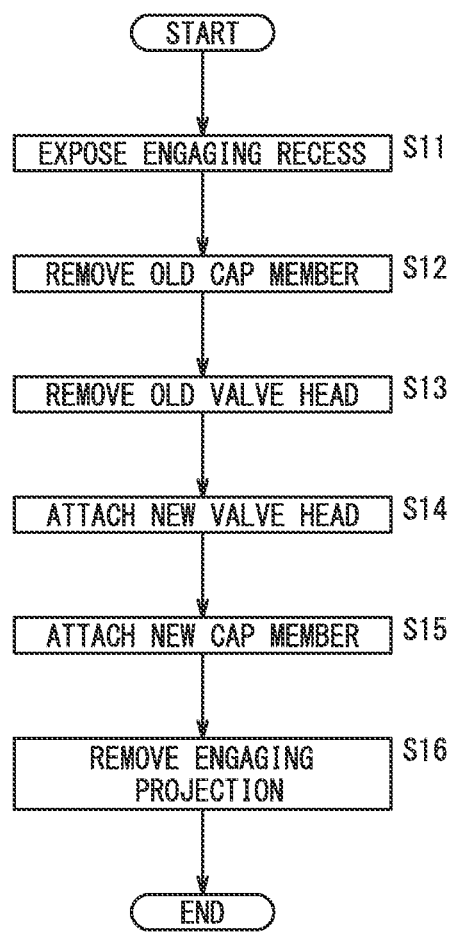
FIG. 7 is a flow chart showing a replacing procedure of the valve element of the shut-off valve.
Figure 8A:
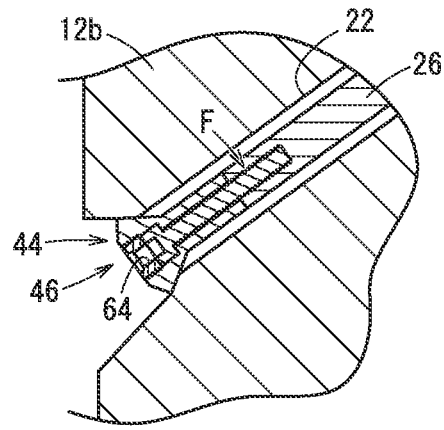
FIGS. 8A, 8B, and 8C are views each showing the state of the shut-off valve during replacement of the valve element.
Figure 8B:
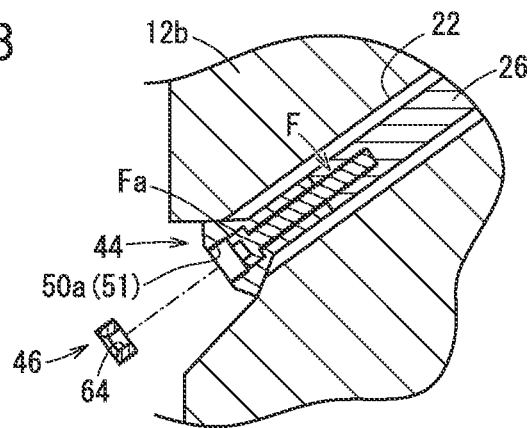
Figure 8C:
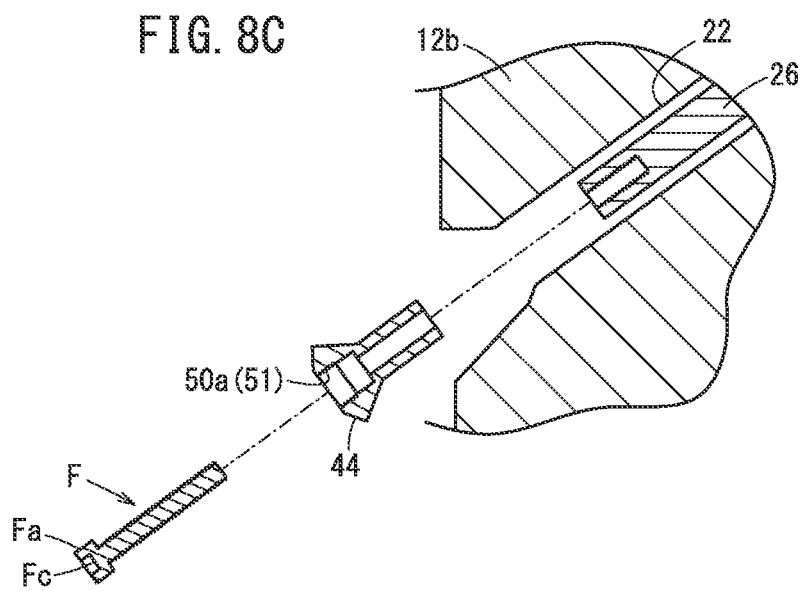

Hereinafter, a replacement method for replacing the used (pre-replacement) valve element 40 with an unused valve element 40 (for replacement) will be described. FIG. 7 is a flow chart showing a replacement procedure of the valve element 40 of the shut-off valve 20. FIGS. 8A to 8C are views each showing the state of the shut-off valve 20 during replacement of the valve element 40. FIGS. 8A to 8C correspond to the first half of the replacement procedure (removal of the valve element 40). Since the latter half of the replacement procedure (attachment of the valve element 40) is substantially the same as the manufacturing procedure of the shut-off valve 20, the latter half of the replacement procedure can be represented by FIGS. 6A to 6C. Hereinafter, the method for replacing the shut-off valve 20 will be described with reference to FIGS. 7, 8A to 8C, and 6A to 6C. For ease of understanding, the used valve element 40, the used cap member 46, and the used valve head 44 are referred to as an old valve element 40 and the like. The unused valve element 40 and the like are referred to as a new cap member 46 and the like.

By shaving the wall portion 66 of the old cap member 46, the engaging recess 64 is exposed (step S11 and FIG. 8A). Then, the old cap member 46 is removed (step S12 and FIG. 8B). First, the removal tool T2 is engaged with the engaging recess 64. Thereafter, the removal tool T2 unscrews the old cap member 46 from the through hole 50 (specifically, the female screw 51) of the old valve head 44. As a result, the old cap member 46 is removed from the old valve head 44. In this way, the cap member 46 can be easily removed, and the cast product can be prevented from adhering to the engaging recess 64 during casting.

Further, the old valve head 44 is removed from the drive shaft 26 (step S13 and FIG. 8C). First, the attachment/detachment tool T0 is engaged with the head portion Fa of the fastening member F through the hole 50*a* of the old valve head 44. Then, the fastening member F is unscrewed from the female screw 27 of the drive shaft 26 by the attachment/detachment tool T0. As a result, the old valve head 44 is removed from the drive shaft 26. Thereafter, the attachment of the new valve head 44 to the drive shaft 26 (step S14 and FIG. 6A), the attachment of the new cap member 46 to the new valve head 44 (step S15 and FIG. 6B), and the removal of the engaging projection 62 from the new cap member 46 (step S16 and FIG. 6C) are performed in this order. Since this procedure is substantially the same as the manufacturing procedure of the shut-off valve 20, a detailed description thereof will be omitted.

(Modification)

Figure 9:
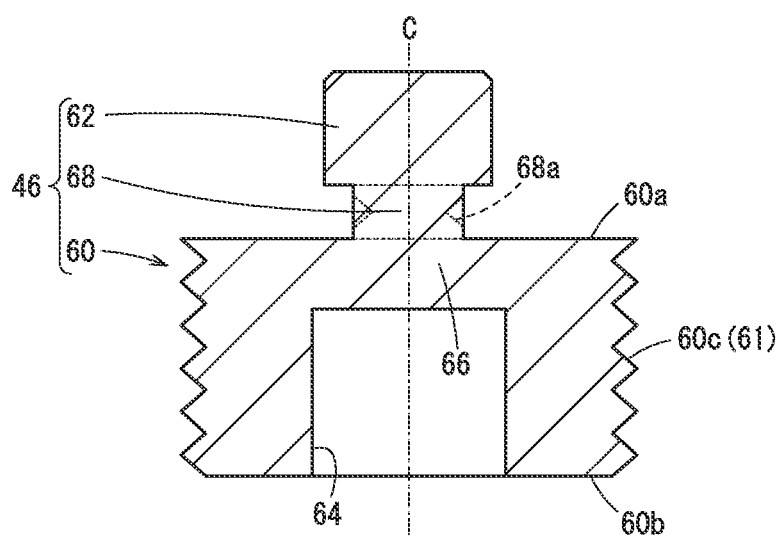
FIG. 9 is a view showing a cap member of a valve element according to a modification.

The present invention is not limited to the above-described embodiment, and various configurations can be adopted therein without departing from the gist of the present invention. FIG. 9 is a view showing a cap member 46 of a valve element 40 of a shut-off valve 20 according to a modification. The cap member 46 according to the modification includes a cuttable portion 68 between a wall portion 66 and an engaging projection 62. The cuttable portion 68 can be cut to remove the engaging projection 62. As a result, it is possible to easily remove the engaging projection 62. That is, when the shut-off valve 20 is manufactured or the valve element 40 is replaced, the cuttable portion 68 is cut by applying a stress to the engaging projection 62, for example. As a result, the engaging projection 62 is removed (step S3 in FIG. 5 and step S16 in FIG. 7). After this cutting, if necessary, the cut surface is machined, ground, polished or the like so as to further smooth the first end face 60*a*.

Here, the cuttable portion 68 has a smaller diameter than the diameter of the engaging projection 62. Therefore, the cuttable portion 68 can be cut more easily than the engaging projection 62. However, the cuttable portion 68 can withstand the torque for screwing the cap member 46 into the valve head 44 by the attachment tool T1 engaged with the engaging projection 62.

In addition to having the smaller diameter than that of the engaging projection 62, the cuttable portion 68 may have a notched portion 68*a* (shown by an imaginary line in FIG. 9). The cuttable portion 68 can be easily cut from the notched portion 68*a*. Also in this case, the cuttable portion 68 can withstand the torque of the attachment tool T1. It should be noted that the cuttable portion 68 may not have a diameter smaller than that of the engaging projection 62, and may have the notched portion 68*a*.

Invention Obtained from Embodiments

The invention that can be understood from each of the above embodiments will be described below.

(1) A cap member (46) for a shut-off valve (20) of the present invention is a cap member for a shut-off valve configured to shut off a suction path (22) through which gas is sucked from a cavity portion (14) of a casting mold (12), the shut-off valve including a valve head (44) in which a through hole (50) is formed, the cap member comprising: a cap member main body (60) screwed into the through hole of the valve head; a first engaging portion (engaging projection 62) configured to engage with a first tool (attachment tool T1) that screws the cap member main body into the valve head; a second engaging portion (engaging recess 64) formed inside the cap member main body and configured to engage with a second tool (removable tool T2) that unscrews the cap member main body from the valve head; and a wall portion (66) formed between the first engaging portion and the second engaging portion and configured to cover the second engaging portion so that the second engaging portion is not exposed when the cap member is viewed from the first engaging portion toward the second engaging portion.

Thus, when the valve element is attached, the first tool is engaged with the first engaging portion to screw the cap member into the valve head, and then the first engaging portion is removed, whereby it is possible to prevent the first engaging portion from hindering the release of the cast product. When the valve element is removed, the wall portion is shaved to expose the second engaging portion, so that the second tool can engage with the second engaging portion. As a result, by using the second tool, the cap member can be unscrewed from the valve head, and the cap member can be removed.

(2) The cap member for the shut-off valve further comprises a cuttable portion (68) formed between the wall portion and the first engaging portion and configured to be cut to remove the first engaging portion. Thus, the first engaging portion can be easily removed by cutting the cuttable portion.

(3) The cuttable portion has a diameter smaller than a diameter of the first engaging portion. Thus, the cuttable portion can be easily cut.

(4) The cuttable portion includes a notched portion (68*a*). Thus, the cuttable portion can be easily cut from the notched portion.

(5) The first engaging portion is an engaging projection (62) configured to engage with the first tool. Thus, the cap member can be screwed into the valve head by using the first tool that engages with the engaging projection.

(6) The second engaging portion is an engaging recess (64) configured to engage with the second tool. Thus, the cap member can be unscrewed from the valve head by using the second tool that engages with the engaging recess.

(7) The first engaging portion is an engaging projection having a polygonal shape and protruding from a first end face (60*a*) of the cap member main body in an axial direction thereof, the second engaging portion is an engaging recess having a polygonal shape and opening on a second end face (60b) of the cap member main body in the axial direction thereof, the second end face being located on an opposite side to the first end face, and the first engaging portion and the second engaging portion are disposed on a central axis (C) of the cap member main body. As a result, since the first engaging portion and the second engaging portion are disposed on the central axis of the cap member main body, screwing and unscrewing by the first tool and the second tool become easy. Further, the first engaging portion has a polygonal shape protruding from the first end face of the cap member main body in the axial direction thereof, and the second engaging portion has a polygonal shape opening on the second end face of the cap member main body in the axial direction thereof, the second end face being located on the opposite side to the first end face. Therefore, the cap member including the first engaging portion and the second engaging portion can be easily fabricated by, for example, shaping a member without the need to combine a plurality of members.

(8) A valve element for a shut-off valve of the present invention is a valve element for a shut-off valve configured to shut off a suction path through which gas in a cavity portion of a casting mold is sucked, the valve element comprising: a valve head including a through hole and attached through the through hole to a drive shaft configured to drive the valve element; and a cap member screwed into the through hole at a distal end portion of the valve head, wherein an engaging portion (engaging recess 64) configured to engage with a tool (removal tool T2) that unscrews the cap member from the valve head is formed inside the cap member, the cap member includes a wall portion configured to cover the engaging portion from a distal end side of the cap member, and a distal end surface (first end face 60a) of the cap member is a flat surface not having a shape engaging with the tool. Thus, since the distal end surface of the cap member is a flat surface, it is possible to prevent the release of the cast product from being hindered. Further, when the valve element is removed, the wall portion is shaved to expose the engaging portion, and the tool is engaged with the engaging portion, whereby the cap member can be unscrewed from the valve head.

(9) A method for manufacturing a shut-off valve of the present invention is a method for manufacturing a shut-off valve by using the cap member described in (1) to (7), the shut-off valve being configured to shut off a suction path through which gas in a cavity portion of a casting mold is sucked, the method comprising: a step (step S1) of inserting a fastening member into the through hole of the valve head to attach the valve head to a drive shaft configured to drive the shut-off valve; a step (step S2) of engaging the first tool with the first engaging portion and screwing the cap member into the through hole of the valve head; and a step (step S3) of removing the first engaging portion. Thus, the cap member is easily screwed into the valve head by using the first tool, and the first engaging portion is removed thereafter, whereby it is possible to prevent the first engaging portion from hindering the release of the cast product.

(10) A method for replacing a valve element of a shut-off valve according to the present invention is a method for replacing a valve element of a shut-off valve configured to shut off a suction path through which gas in a cavity portion of a casting mold is sucked, wherein a pre-replacement valve element includes: a first valve head including a through hole and attached through the through hole to a drive shaft configured to drive the pre-replacement valve element; and a first cap member screwed into the through hole at a distal end portion of the first valve head, an engaging portion is formed inside the first cap member, and the first cap member includes a wall portion configured to cover the engaging portion from a distal end side of the first cap member, and wherein a valve element for replacement includes: a second valve head; and a second cap member, the second valve head includes a through hole, and the second cap member includes a first engaging portion, a second engaging portion formed inside the second cap member, and a wall portion formed between the first engaging portion and the second engaging portion and configured to cover the second engaging portion so that the second engaging portion is not exposed when the second cap member is viewed from the first engaging portion toward the second engaging portion, the method comprising: a step (step S11) of shaving the wall portion of the first cap member to expose the engaging portion; a step (step S12) of removing the first cap member from the first valve head by engaging a tool (removal tool T2) with the engaging portion and unscrewing the first cap member from the through hole of the first valve head; a step (step S13) of removing the first valve head from the drive shaft; a step (step S14) of inserting a fastening member into the through hole of the second valve head to attach the second valve head to the drive shaft; a step (step S15) of engaging a tool (attachment tool T1) with the first engaging portion of the second cap member and screwing the second cap member into the through hole of the second valve head; and a step (step S16) of removing the first engaging portion of the second cap member. Thus, it is possible to prevent the first engaging portion and the second engaging portion from hindering the release of the cast product, while facilitating the attachment and removal of the cap member using the first tool and the second tool.

What is claimed is:

1. A cap member for a shut-off valve configured to shut off a suction path through which gas is sucked from a cavity portion of a casting mold, the shut-off valve including a valve head in which a through hole is formed,
the cap member comprising:
   a cap member main body screwed into the through hole of the valve head;
   a first engaging portion configured to engage with a first tool that screws the cap member main body into the valve head;
   a second engaging portion formed inside the cap member main body and configured to engage with a second tool that unscrews the cap member main body from the valve head; and
   a wall portion formed between the first engaging portion and the second engaging portion and configured to cover the second engaging portion so that the second engaging portion is not exposed when the cap member is viewed from the first engaging portion toward the second engaging portion.

2. The cap member for the shut-off valve according to claim 1, further comprising
   a cuttable portion formed between the wall portion and the first engaging portion and configured to be cut to remove the first engaging portion.

3. The cap member for the shut-off valve according to claim 2, wherein
   the cuttable portion has a diameter smaller than a diameter of the first engaging portion.

4. The cap member for the shut-off valve according to claim 2, wherein
   the cuttable portion includes a notched portion.

5. The cap member for the shut-off valve according to claim 1, wherein
the first engaging portion is an engaging projection configured to engage with the first tool.

6. The cap member for the shut-off valve according to claim 1, wherein
the second engaging portion is an engaging recess configured to engage with the second tool.

7. The cap member for the shut-off valve according to claim 1, wherein
the first engaging portion is an engaging projection having a polygonal shape and protruding from a first end face of the cap member main body in an axial direction thereof,
the second engaging portion is an engaging recess having a polygonal shape and opening on a second end face of the cap member main body in the axial direction thereof, the second end face being located on an opposite side to the first end face, and
the first engaging portion and the second engaging portion are disposed on a central axis of the cap member main body.

8. A valve element for a shut-off valve configured to shut off a suction path through which gas in a cavity portion of a casting mold is sucked, the valve element comprising:
a valve head including a through hole and attached through the through hole to a drive shaft configured to drive the valve element; and
a cap member screwed into the through hole at a distal end portion of the valve head, wherein
an engaging portion configured to engage with a tool that unscrews the cap member from the valve head is formed inside the cap member,
the cap member includes a wall portion configured to cover the engaging portion from a distal end side of the cap member, and
a distal end surface of the cap member is a flat surface not having a shape engaging with the tool.

9. A method for manufacturing a shut-off valve by using a cap member for a shut-off valve, the shut-off valve being configured to shut off a suction path through which gas in a cavity portion of a casting mold is sucked, and including a valve head in which a through hole is formed, wherein
the cap member includes:
a cap member main body screwed into the through hole of the valve head;
a first engaging portion configured to engage with a first tool that screws the cap member main body into the valve head;
a second engaging portion formed inside the cap member main body and configured to engage with a second tool that unscrews the cap member main body from the valve head; and
a wall portion formed between the first engaging portion and the second engaging portion and configured to cover the second engaging portion so that the second engaging portion is not exposed when the cap member is viewed from the first engaging portion toward the second engaging portion,
the method comprising:
inserting a fastening member into the through hole of the valve head to attach the valve head to a drive shaft configured to drive the shut-off valve;
engaging the first tool with the first engaging portion and screwing the cap member into the through hole of the valve head; and
removing the first engaging portion.

10. A method for replacing a valve element of a shut-off valve configured to shut off a suction path through which gas in a cavity portion of a casting mold is sucked, wherein
a pre-replacement valve element includes:
a first valve head including a through hole and attached through the through hole to a drive shaft configured to drive the pre-replacement valve element; and
a first cap member screwed into the through hole at a distal end portion of the first valve head,
an engaging portion is formed inside the first cap member, and
the first cap member includes a wall portion configured to cover the engaging portion from a distal end side of the first cap member, and wherein
a valve element for replacement includes:
a second valve head; and
a second cap member,
the second valve head includes a through hole, and
the second cap member includes:
a first engaging portion;
a second engaging portion formed inside the second cap member; and
a wall portion formed between the first engaging portion and the second engaging portion and configured to cover the second engaging portion so that the second engaging portion is not exposed when the second cap member is viewed from the first engaging portion toward the second engaging portion,
the method comprising:
shaving the wall portion of the first cap member to expose the engaging portion;
removing the first cap member from the first valve head by engaging a tool with the engaging portion and unscrewing the first cap member from the through hole of the first valve head;
removing the first valve head from the drive shaft;
inserting a fastening member into the through hole of the second valve head to attach the second valve head to the drive shaft;
engaging a tool with the first engaging portion of the second cap member and screwing the second cap member into the through hole of the second valve head; and
removing the first engaging portion of the second cap member.

\* \* \* \* \*